US012361680B1

(12) United States Patent
Tao et al.

(10) Patent No.: US 12,361,680 B1
(45) Date of Patent: Jul. 15, 2025

(54) WEBPAGE CATEGORIZATION BASED ON IMAGE CLASSIFICATION OF WEBPAGE SCREEN CAPTURE

(71) Applicant: Netskope, Inc., Santa Clara, CA (US)

(72) Inventors: Rongrong Tao, Fremont, CA (US); Jason Bryslawskyj, San Diego, CA (US); Yi Zhang, Santa Clara, CA (US); Dong Guo, San Jose, CA (US); Yihua Liao, Palo Alto, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/805,732

(22) Filed: Aug. 15, 2024

(51) Int. Cl.
*G06V 10/764* (2022.01)
*G06V 10/70* (2022.01)
*G06V 10/762* (2022.01)
*G06V 10/774* (2022.01)
*G06V 20/50* (2022.01)

(52) U.S. Cl.
CPC .......... *G06V 10/764* (2022.01); *G06V 10/762* (2022.01); *G06V 10/774* (2022.01); *G06V 10/87* (2022.01); *G06V 20/50* (2022.01)

(58) Field of Classification Search
CPC .. G06V 10/764; G06V 10/762; G06V 10/774; G06V 10/87; G06V 20/50
See application file for complete search history.

(56) References Cited

U.S. PATENT DOCUMENTS

| 5,440,723 | A | 8/1995 | Arnold et al. |
| 6,513,122 | B1 | 1/2003 | Magdych et al. |
| 6,622,248 | B1 | 9/2003 | Hirai |
| 7,080,408 | B1 | 7/2006 | Pak et al. |
| 7,298,864 | B2 | 11/2007 | Jones |
| 7,376,719 | B1 | 5/2008 | Shafer et al. |
| 7,735,116 | B1 | 6/2010 | Gauvin |

(Continued)

FOREIGN PATENT DOCUMENTS

EP 1063833 A2 12/2000

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Beemnet W Dada

(57) ABSTRACT

A network security system that classifies webpages and uses the classification of the webpages to enforce relevant security policies is disclosed. To classify a webpage, a screenshot of at least a portion of the webpage is captured. An embedding engine generates a subject image embedding of the screenshot. The subject image embedding is classified by an image classifier that includes an index of training image embeddings each having a label of their classification and an associated approximate nearest neighbors model trained to identify the label of the closest training image embedding to the subject image embedding and a score representing their similarity. The webpage is classified based at least in part on the score and the label from the image classifier. The network security system applies security policies to requests from client devices that identify the webpage as its destination based at least in part on the webpage classification.

20 Claims, 9 Drawing Sheets
(2 of 9 Drawing Sheet(s) Filed in Color)

(56) References Cited

U.S. PATENT DOCUMENTS

| | | | |
|---|---|---|---|
| 7,966,654 | B2 | 6/2011 | Crawford |
| 8,000,329 | B2 | 8/2011 | Fendick et al. |
| 8,296,178 | B2 | 10/2012 | Hudis et al. |
| 8,793,151 | B2 | 7/2014 | DelZoppo et al. |
| 8,839,417 | B1 | 9/2014 | Jordan |
| 9,197,601 | B2 | 11/2015 | Pasdar |
| 9,225,734 | B1 | 12/2015 | Hastings |
| 9,231,968 | B2 | 1/2016 | Fang et al. |
| 9,280,678 | B2 | 3/2016 | Redberg |
| 9,811,662 | B2 | 11/2017 | Sharpe et al. |
| 10,084,825 | B1 | 9/2018 | Xu |
| 10,223,616 | B1* | 3/2019 | Malin ............ G06F 18/24143 |
| 10,237,282 | B2 | 3/2019 | Nelson et al. |
| 10,334,442 | B2 | 6/2019 | Vaughn et al. |
| 10,382,468 | B2 | 8/2019 | Dods |
| 10,484,334 | B1 | 11/2019 | Lee et al. |
| 10,826,941 | B2 | 11/2020 | Jain et al. |
| 10,834,128 | B1* | 11/2020 | Rajagopalan ......... H04L 51/212 |
| 11,032,301 | B2 | 6/2021 | Mandrychenko et al. |
| 11,036,856 | B2 | 6/2021 | Graun et al. |
| 11,281,775 | B2 | 3/2022 | Burdett et al. |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-LeMair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2006/0156401 | A1 | 7/2006 | Newstadt et al. |
| 2007/0204018 | A1 | 8/2007 | Chandra et al. |
| 2007/0237147 | A1 | 10/2007 | Quinn et al. |
| 2008/0069480 | A1 | 3/2008 | Aarabi et al. |
| 2008/0134332 | A1 | 6/2008 | Keohane et al. |
| 2009/0144818 | A1 | 6/2009 | Kumar et al. |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2011/0119481 | A1 | 5/2011 | Auradkar et al. |
| 2011/0145594 | A1 | 6/2011 | Jho et al. |
| 2012/0278896 | A1 | 11/2012 | Fang et al. |
| 2013/0159694 | A1 | 6/2013 | Chiueh et al. |
| 2013/0298190 | A1 | 11/2013 | Sikka et al. |
| 2013/0347085 | A1 | 12/2013 | Hawthorn et al. |
| 2014/0013112 | A1 | 1/2014 | Cidon et al. |
| 2014/0068030 | A1 | 3/2014 | Chambers et al. |
| 2014/0068705 | A1 | 3/2014 | Chambers et al. |
| 2014/0259093 | A1 | 9/2014 | Narayanaswamy et al. |
| 2014/0282843 | A1 | 9/2014 | Buruganahalli et al. |
| 2014/0359282 | A1 | 12/2014 | Shikfa et al. |
| 2014/0366079 | A1 | 12/2014 | Pasdar |
| 2015/0100357 | A1 | 4/2015 | Seese et al. |
| 2016/0323318 | A1 | 11/2016 | Terrill et al. |
| 2016/0350145 | A1 | 12/2016 | Botzer et al. |
| 2017/0064005 | A1 | 3/2017 | Lee |
| 2017/0093917 | A1 | 3/2017 | Chandra et al. |
| 2017/0250951 | A1 | 8/2017 | Wang et al. |
| 2019/0104154 | A1* | 4/2019 | Kumar ................ G06N 20/00 |
| 2020/0050686 | A1 | 2/2020 | Kamalapuram et al. |
| 2020/0074299 | A1* | 3/2020 | Cho ................ G06F 18/24323 |
| 2020/0151222 | A1* | 5/2020 | Mannar ............... G06F 16/951 |
| 2021/0073580 | A1* | 3/2021 | Chen .................. G06F 16/951 |

OTHER PUBLICATIONS

Huckaby, Jeff "Ending Clear Text Protocols," Rackaid.com, Dec. 9, 2008, 3 pgs.
Newton, Harry "fabric," Newton's Telecom Dictionary, 30th Updated, Expanded, Anniversary Edition, 2016, 3 pgs.
Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.
Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.
McCullagh, Declan, "How safe is instant messaging? A security and privacy survey," CNET, Jun. 9, 2008, 14 pgs.
Beck et al., "IBM and Cisco: Together for a World Class Data Center," IBM Redbooks, Jul. 2013, 654 pgs.
Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/.
Zetter, Kim, "Revealed: The Internet's Biggest Security Hole," Wired, Aug. 26, 2008, 13 pgs.
Adya et al., "Farsite: Federated, available, and reliable storage for an incompletely trusted environment," SIGOPS Oper. Syst. Rev. 36, SI, Dec. 2002, pp. 1-14.
Agrawal et al., "Order preserving encryption for numeric data," In Proceedings of the 2004 ACM SIGMOD international conference on Management of data, Jun. 2004, pp. 563-574.
Balakrishnan et al., "A layered naming architecture for the Internet," ACM SIGCOMM Computer Communication Review, 34(4), 2004, pp. 343-352.
Downing et al., Naming Dictionary of Computer and Internet Terms, (11th Ed.) Barron's, 2013, 6 pgs.
Downing et al., Dictionary of Computer and Internet Terms, (10th Ed.) Barron's, 2009, 4 pgs.
Zoho Mail, "Email Protocols: What they are & their different types," 2006, 7 pgs. available at https://www.zoho.com/mail/glossary/email-protocols.html#:~:text=mode of communication.-,What are the different email protocols%3F, and also has defined functions.
NIIT, Special Edition Using Storage Area Networks, Que, 2002, 6 pgs.
Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits?Offer=abt_pubpro_AI-Insider.
Fortinet, FortiGate—3600 User Manual (vol. 1, Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.
Fortinet,FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al., "Metadata Statistics for a Large Web Corpus," LDOW2012, Apr. 16, 2012, 6 pgs.
Oxford Dictionary of Computing (6th Ed.), 2008, 5 pgs.

(56) References Cited

OTHER PUBLICATIONS

Paxson, Vern, "Bro: a System for Detecting Network Intruders in Real-Time," Proceedings of the 7th USENIX Security Symposium, Jan. 1998, 22 pgs.

Fortinet Inc., U.S. Appl. No. 62/503,252, "Building a Cooperative Security Fabric of Hierarchically Interconnected Network Security Devices." n.d., 87 pgs.

Song et al., "Practical techniques for searches on encrypted data," In Proceeding 2000 IEEE symposium on security and privacy. S&P 2000, May 2000, pp. 44-55.

Dean, Tamara, Guide to Telecommunications Technology, Course Technology, 2003, 5 pgs.

U.S. Appl. No. 60/520,577, "Device, System, and Method for Defending a Computer Network," filed Nov. 17, 2003, 21 pgs.

U.S. Appl. No. 60/552,457, "Fortinet Security Update Technology," filed Mar. 2004, 6 pgs.

Tittel, Ed, Unified Threat Management For Dummies, John Wiley & Sons, Inc., 2012, 76 pgs.

Fortinet, FortiOS Handbook: UTM Guide (Version 2), Oct. 15, 2010, 188 pgs.

Full Definition of Security, Wayback Machine Archive of Merriam-Webster on Nov. 17, 2016, 1 pg.

Definition of Cooperative, Wayback Machine Archive of Merriam-Webster on Nov. 26, 2016, 1 pg.

Pfaffenberger, Bryan, Webster's New World Computer Dictionary, (10th Ed.), 2003, 5 pgs.

\* cited by examiner

WEBPAGE CATEGORIZATION BASED ON IMAGE CLASSIFICATION OF WEBPAGE SCREEN CAPTURE

BACKGROUND

Many enterprises use webpage and website categorization or classification to determine whether to allow enterprise devices to access the relevant uniform resource link ("URL"). For example, websites deemed to be unsuitable or unsavory may be blocked or the users at least warned or counseled on proceeding. For example, gambling and other adult content websites (e.g., pornographic websites) are often rife with viruses and generally unsuitable for business purposes. Parked domain websites are often dangerous as they may appear harmless but contain viruses, links to viruses, or the like. To accurately classify or categorize unknown websites, however, poses a challenge to many enterprises. The content provided on websites may include text-based content, image-based content, video content, audio content, or a combination. Many unsavory or unsuitable websites (e.g., adult content, gambling, parked domains, and the like) are particularly difficult to classify since they are often image-heavy. Further, they lack uniformity in color and content. Image-based website classification is often difficult. Images from one website to another differ substantially even within the same category. For example, many websites include advertising content that may include text, images, videos, audio, or a combination, and the advertising content may vary extensively between similar types of websites. Further, the content that is advertising versus the content that is website content may be difficult to distinguish. Accordingly, while many classifiers can accurately classify webpages based on text content, image-heavy websites may escape accurate classification due to classifier limitations. Many image classifiers require really large training data sets and long amounts of time and processing. Accordingly, improvements are needed for accurate classification of webpages, and particularly image-heavy webpages.

SUMMARY

Methods, systems, and computer-readable memory devices storing instructions are described that perform enhanced website categorization based on image classification of website screenshots.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method includes obtaining a subject image, where the subject image includes a screenshot of a webpage associated with a uniform resource locator. The method further includes classifying the webpage, the classifying may include generating a subject image embedding of the subject image and submitting the subject image embedding to an image classifier. The image classifier may include an index of training image embeddings, where the training image embeddings each may include a label containing a classification of a training image associated with the respective training image embedding, and the image classifier further includes an approximate nearest neighbors model associated with the index and trained to identify the label of a closest training image embedding to the subject image embedding and a score representing a similarity of the subject image embedding to the closest training image embedding. To classify the webpage, the method also includes classifying the subject image based on the score and the label identified by the approximate nearest neighbors model, and classifying the webpage is based on the classification of the subject image. The method also includes intercepting a request from a client device, where the request identifies the uniform resource locator as a destination and applying a security policy to the request based at least in part on the classification of the webpage. Other embodiments of this aspect include corresponding computer systems, apparatus, and computer programs recorded on one or more computer storage devices, each configured to perform the actions of the methods.

Implementations may include one or more of the following features. Optionally, the method may include obtaining the subject image using crawler to capture the screenshot.

Optionally, the method may include storing the uniform resource locator and the classification of the webpage in a classified domains listing. Optionally, the method may include subsequent to intercepting the request, searching the classified domains listing for the uniform resource locator identified as the destination in the request and in response to finding the uniform resource locator in the classified domains listing, identifying the classification of the webpage associated with the uniform resource locator in the classified domains listing. Optionally, the method may include subsequent to intercepting the request, searching the classified domains listing for the uniform resource locator identified as the destination in the request and in response to not finding the uniform resource locator in the classified domains listing, capturing the screenshot of the webpage.

Optionally, classifying the webpage based on the subject image is in response to one or more other classifiers failing to classify the webpage.

Optionally, the method may include generating the training image embeddings with the embedding engine used to generate the subject image embedding.

Optionally, the index may include one or more embedding clusters, where each of the embedding clusters may include a subset of the training image embeddings associated with training images having the same classification contained in the training embedding's label. The index may further include a negative subset of the training image embeddings, which may include training image embeddings of negative training images each having a label identifying a default classification. Optionally, the index may include a first embedding cluster labeled with a gambling classification, a second embedding cluster labeled with a parked domain classification, and a third embedding cluster labeled with a pornography classification.

Optionally, classifying the subject image based on the score and the identified label may include classifying the subject image with the identified label when the score is equal to or exceeds a threshold value and classifying the subject image with a default label when the score is below the threshold value. Implementations of the described techniques may include hardware, a method or process, or computer software on a computer-accessible medium.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
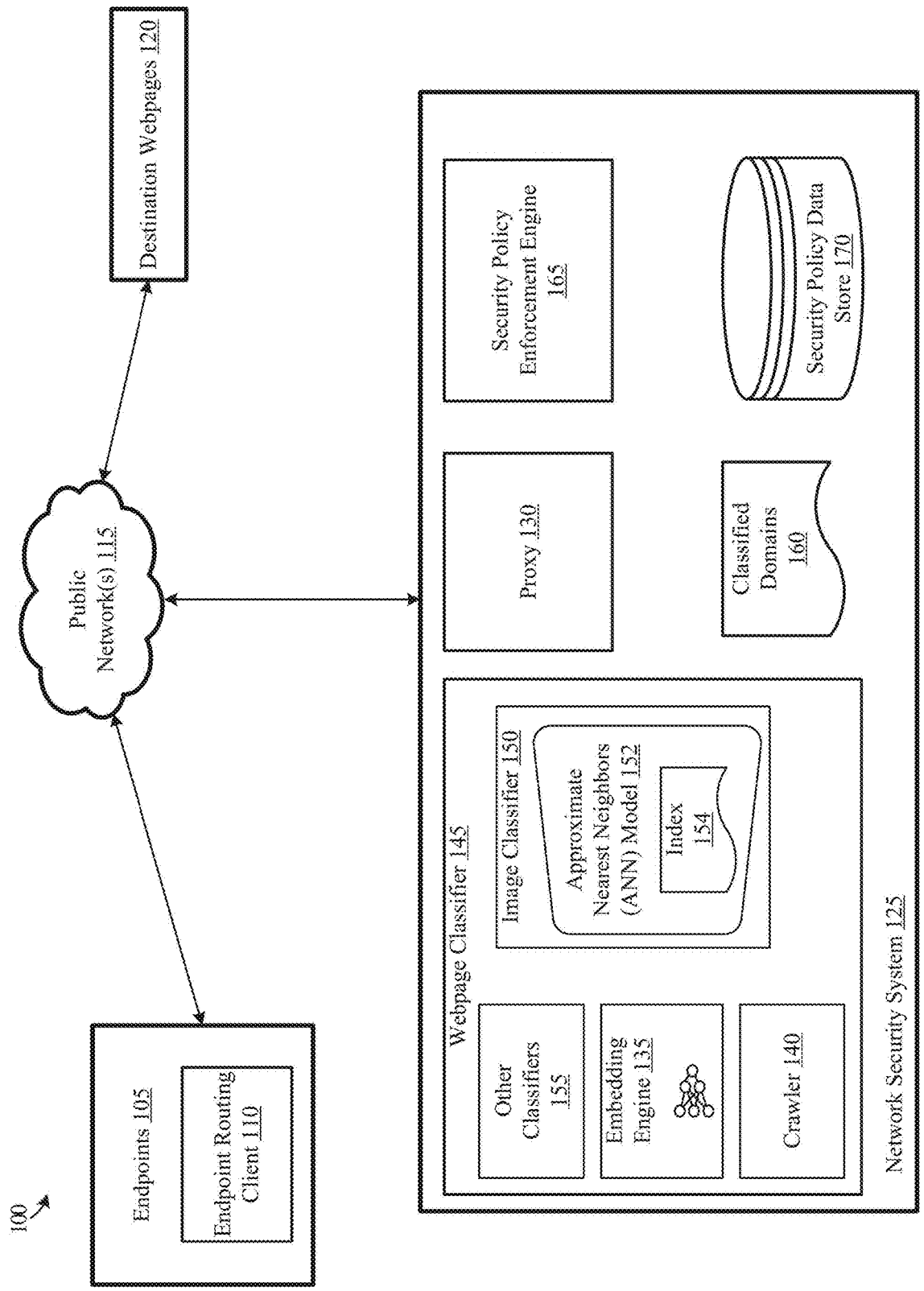
FIG. 1 illustrates a system that includes webpage classification functionality, according to some embodiments.

Website (e.g., webpage) categorization is important in network security systems. Based on the category of the website or webpage, enterprises may choose to block, restrict, or enforce other security policies on accessing the website or webpage.

However, as described above, classification of webpages can be challenging. In particular, image-heavy webpages often prove difficult to classify. Further, many unsavory or undesirable website and webpages are image-heavy. To address these issues, described herein are systems and methods for classifying webpages based on screenshots (e.g., screen captures, images of displayed webpages, and the like) of the webpage.

To classify the images, an image classifier is trained to classify the various or desired types of webpages. For example, the image classifier may be trained to classify parked domains, gambling webpages, and other adult content. Initially, an embedding engine is trained to generate image embeddings when an image is provided to the embedding engine. The image embedding may be, for example, a multi-dimensional vector representing the image. The embedding engine may be a model trained using deep learning. The image classifier may be trained quickly such that new classes of webpages may be quickly added. Training images including screenshots of many webpages may be used to train the image classifier. The training images are provided to the embedding engine to generate training image embeddings. The image classifier is built by generating an index of the training image embeddings and an associated approximate nearest neighbors model. To create the index, the training image embeddings are indexed, and labels are applied to each embedding that identifies the classification of the associated training image. Clusters of the training image embeddings each having the same classification may be formed, and the classification label can be applied. For example, a number of training images may be images or screenshots of gambling webpages. Each of the training image embeddings of the images of gambling webpages may be clustered and labeled with a gambling classification. Other classifications are formed similarly, where the training image embeddings of the same class of images are clustered and a label applied with the relevant classification. The index may also include training image embeddings of negative images that may have a default classification or a negative classification applied. The approximate nearest neighbors model associated with the index is generated and is trained to receive a subject image embedding and identify the closest training image embedding from the index and a score representing the similarity of the subject image embedding to the closest training image embedding. A threshold can be set for image classification. The image classifier can use the score to determine whether to apply the classification identified in the label. For example, if the score meets or exceeds the threshold value, the classification identified in the label may be applied to the subject image. If the score is below the threshold value, a default classification or no classification may be applied to the subject image.

A webpage classifier may include the image classifier as well as other classifiers (e.g., text-based classifier, audio-based classifier, video-based classifier, or the like), and the webpage classifier may classify the webpage based on the image classifier or a combination of the image classifier and the other classifiers. Once the webpage classifier classifies a webpage, it may store the URL of the webpage and the classification in a classified domains listing.

The network security system may intercept requests transmitted from client devices (e.g., client endpoints) to destination webpages. Upon receiving the requests, a security policy enforcement engine of the network security system may look up the classification in the classified domains listing or request that the webpage classifier classify the webpage if not found in the classified domains listing. The security policy enforcement engine can apply security policies based at least in part on the webpage classification. Accordingly, for example, if a webpage is classified as a gambling webpage, the security policy enforcement engine may be configured to block the request, transmit a warning to the user of the client device, modify a safety score associated with the user of the client device, and/or the like.

The present invention provides numerous technical advantages. Webpages and websites that are undesirable or dangerous are often difficult to classify due to being image-heavy. The approach presented here allows for accurate classification of webpages that are not easily classified using other approaches. Further, the image classifier described is capable of classifying images using training data sets that are quite small including, for example, less than one hundred images for a given class. Additional classes can be added in mere minutes and do not require days of time and processing resources to retrain the image classifier. Further, ensuring the webpages are accurately classified helps reduce the spread of virus and malware activity throughout corporations, saving time, money, and processing resources.

Turning now to FIG. 1, the components of system 100 that include a network security system 125 with the webpage classification and security enforcement features described above are depicted. System 100 includes endpoints 105, public networks 115, destination webpages 120, and network security system 125.

Endpoints 105 include any enterprise or client device including desktops, laptops, mobile devices, servers, access points, and the like. Mobile devices include smartphones, smart watches, and the like. Endpoints 105 may also include internet of things (IoT) devices. Endpoints 105 may include any number of components including those described with respect to computing device 900 of FIG. 9 including processors, output devices, communication interfaces, input devices, memory, and the like, all not depicted here for clarity. Endpoints 105 may include any number of endpoints, which may be used to access content (e.g., documents, images, and the like) stored in the destination webpages 120 and otherwise interact with destination webpages 120. Endpoints 105 include endpoint routing client 110. In some embodiments, endpoint routing client 110 may be a client installed on the endpoint 105. In other embodiments, endpoint routing client 110 may be implemented using a gateway that traffic from each endpoint 105 passes through for transmission out of a private or subnetwork.

Endpoint routing client 110 routes network traffic transmitted from its respective endpoint 105 to the network security system 125. Depending on the type of device for which endpoint routing client 110 is routing traffic, endpoint routing client 110 may use or be a virtual private network (VPN) such as VPN on demand or per-app-VPN that use certificate-based authentication. For example, for some devices having a first operating system, endpoint routing client 110 me be a per-app-VPN may be used or a set of domain-based VPN profiles may be used. For other devices having a second operating system, endpoint routing client 110 may be a cloud director mobile app. Endpoint routing client 110 can also be an agent that is downloaded using e-mail or silently installed using mass deployment tools. In some embodiments, endpoint routing client 110, might be delivered indirectly, for example, via an application store (not shown).

Public network 115 may be any public network including, for example, the Internet. Public network 115 couples endpoints 105, network security system 125, and destination webpages 120, such that any may communicate with any other via public network 115. The actual communication path can be point-to-point over public network 115 and may include communication over private networks (not shown). Communications can occur using a variety of network technologies, for example, private networks, Virtual Private Network (VPN), multiprotocol label switching (MPLS), local area network (LAN), wide area network (WAN), Public Switched Telephone Network (PSTN), Session Initiation Protocol (SIP), wireless networks, point-to-point networks, star network, token ring network, hub network, Internet, or the like. Communications may use a variety of protocols. Communications can use appropriate application programming interfaces (APIs) and data interchange formats, for example, Representational State Transfer (REST), JavaScript Object Notation (JSON), Extensible Markup Language (XML), Simple Object Access Protocol (SOAP), Java Message Service (JMS), Java Platform Module System, and the like. Additionally, a variety of authorization and authentication techniques, such as username/password, Open Authorization (OAuth), Kerberos, SecureID, digital certificates and more, can be used to secure communications.

Destination webpages 120 can be any publicly available or privately available location accessible using a uniform resource locator ("URL"). For example, destination webpages 120 can include cloud computing and storage services, financial services, e-commerce services, parked domains, gambling websites, pornography websites, banking websites, educational websites, search engine webpages, or any other type of applications, websites, or platforms that one can access with a URL. Destination webpages 120 may provide functionality to users that can be implemented in the cloud and that can be the target of data loss prevention (DLP) policies, for example, logging in, editing documents, downloading data, reading customer contact information, entering payables, deleting documents, and the like. In some embodiments, destination webpages 120 can be a network service or application, web-based, or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. While only one destination webpages 120 is depicted in FIG. 1, destination webpages 120 represents any number of destination webpages available via public network 115. Destination webpages may be sanctioned (e.g., those that a company provides for employee use and of which the company's information technology (IT) department is aware) or unsanctioned (e.g., those a company is not aware of or otherwise are not authorized for use by the company).

Network security system 125 may provide network security services to endpoints 105. Endpoint routing client 110 may route traffic from the endpoints 105 to network security system 125 to enforce security policies including DLP policies, which may be based at least in part on the classification of the destination of the traffic. Network security system 125 may be one or more computing systems such as computing device 900 as described with respect to FIG. 9. Network security system 125 includes webpage classifier 145, proxy 130, classified domains 160, security policy enforcement engine 165, and security policy data store 170. The modules (e.g., webpage classifier 145, security policy enforcement engine 165) and repositories (e.g., classified domains 160, security policy data store 170) of network security system 125 may be implemented in hardware or software and need not be divided up in precisely the same blocks as shown in FIG. 1. Some of the modules and repositories can also be implemented on different memories, processors, or computers or spread among any number of different memories, processors, or computers. In addition, in some embodiments, modules may be combined, operated in parallel, or in a different sequence than that shown without affecting the functions achieved and without departing from the spirit of this disclosure. Also, as used herein, the term "module" can include "sub-modules," which themselves can be considered to constitute modules. The term module may be interchanged with component and neither term requires a specific hardware element but rather indicates a device or software that is used to provide the described functionality. The modules (i.e., shown as blocks and data stores) in network security system 125 may, in some embodiments, also be thought of as flowchart steps in a method. In some embodiments, a software module need not have all its code disposed contiguously in memory (e.g., some parts of the code can be separated from other parts of the code with code from other modules or other functions disposed in between).

Webpage classifier 145 classifies destination webpages 120. Webpage classifier 145 includes embedding engine 135, crawler 140, image classifier 150, and other classifiers 155. Webpage classifier 145 may use other classifiers 155, which may include text-based classifiers, audio-based classifiers, video-based classifiers, or any other type of classifier as input to determine how to classify a destination webpage 120. In some embodiments, for example, a text-based classifier may be used first to determine whether a sufficient classification is determined based, for example, on a confidence score. If a sufficient classification is determined by one of the other classifiers 155, image classifier 150 may not be used in some embodiments. In some embodiments, classifications from image classifier 150 and other classifiers 155 may be determined and webpage classifier 145 may decide, based on scoring, for example, which classification to use. A depiction and description webpage classifier 145 and data flow throughout is provided in FIG. 3 and its corresponding description.

Embedding engine 135 uses a deep learning image embedding model (e.g., deep learning image embedding model 210 of FIG. 2), which may be stored in a model data store (e.g., model data store 230 of FIG. 2), to generate image embeddings. A single image embedding model may be used for each of the image embeddings so they are compatible with each of the described components. Embedding engine 135 receives an image for which an image embedding is desired. Embedding engine 135 may perform functions on the image data to provide the image data as input to the image embedding model. For example, cropping, resolution, and the like may be performed on the image to ensure it meets the requirements of the image embedding model. Embedding engine 135 provides the image data to the image embedding model and receives, as output, an image embedding. Image embeddings are semantically rich multi-dimensional feature vectors. For example, the feature vectors may have five hundred twelve (512) dimensions. Embedding engine 135 may output the image embeddings to the requesting module once generated.

The deep learning image embedding model may be a neural network (NN)-based image encoder model (e.g., a convolutional neural network (CNN)). The image embedding model may be trained using contrastive training framework such as, for example, simCLR. Image models may be trained in an unsupervised fashion by taking each sample image and transforming (augmenting) it in a way that does not destroy the semantic information in the image. For example, random rotations, random color distortions, and random crops (e.g., with the crop size restricted to a large area of the original image) may be used to augment the sample image. These augmented sample images are used to train the image embedding model. The image embedding model takes image data as inputs and, in return, outputs an image embedding (e.g., a multi-dimensional feature vector). During training, the image embedding model learns to maximize the similarity of the image embedding from the original image to that of the augmented image while simultaneously minimizing the similarity to all other images in the batch of training images. A loss function is used for training, which may be, for example, essentially the softmax of the cosine similarity of all pairs of image representations including the original and augmented original image. After training, the image embedding model can transform images into a generic and semantically rich vector representation (i.e., the image embeddings) without the need for supervised training. The image embeddings can then be used in a downstream model such as the described image classifier 150.

Image classifier 150 classifies images using approximate nearest neighbors (ANN) model 152 and index 154. Image classifier 150 uses the output of the ANN model 152 to determine what class an image falls into. To understand this, a description of the generation of index 54 and ANN model 152 is helpful. An index and ANN model generator (e.g., index and ANN model generator 225 of FIG. 2) may be used to generate index 154 and ANN model 152. The index and ANN model generator (not shown) may be included in network security system 125 or may be hosted on a training platform. In some embodiments, the index and ANN model generator is included in network security system 125 to ensure that newly identified classes may be quickly added to the image classifier 150. The index and ANN model generator may generate index 154 by indexing image embeddings and generating ANN model 152 to use with index 154. In some embodiments, index 154 is built dynamically in memory on demand when an index is needed. For example, when an index is needed for image classification, the relevant image embeddings are accessed from an embedding data store (e.g., embeddings data store 220 of FIG. 2) and index 154 is generated and used by ANN model 152. Image embeddings may be received from embedding engine 135 and used to generate a new index or may be added to an existing index. When adding to an existing index, the previous index may be stored, and a new index generated including both the old image embeddings and the newly added image embeddings. When the index is dynamically generated, the new image embeddings are stored with the old image embeddings to generate the new index. Any time an index is newly generated or modified, or the stored embeddings used to dynamically generate the index are changed, a new ANN model is generated to use with the index because the ANN model and associated index are linked to be used together. Each index 154 creates an embedding space, and ANN model 152 is trained to identify, given a subject embedding, the closest reference image embedding in the embedding space. Embedding similarity may be measured by angular distance. An example equation is $D=\sqrt{2-2*\cos(x\_r, x\_s)}$, where $x\_r$ is the reference embedding, and $x\_s$ is the subject embedding. In some embodiments, the Annoy framework is used which leverages the approximate nearest neighbors algorithm to retrieve similar vectors from index 154. While dynamic index generation may be performed, a static index 154 may be used.

To classify images, the index and ANN model generator clusters the image embeddings in index 154 into embedding clusters. The index and ANN model generator labels the embedding clusters with a corresponding label such that each image embedding in the embedding cluster is labeled with the label for the cluster. For example, images depicting parked domain websites are labeled with a parked domain label and included in a parked domain cluster. The index and ANN model generator generates ANN model 152 to return the label of the image embedding of the most similar image and a score indicating the similarity. For example, the score may be an angular distance normalized to a value between zero and one hundred (0-100), which may be thought of as a percent of similarity. In other words, a score of eighty-five (85) may be thought of as representing that the images of the corresponding image embeddings are approximately eighty-five (85) percent similar.

Crawler 140 may be a web crawler or web spider that searches public network 115 for destination webpages 120 that are not yet classified in classified domains listing 160. In some embodiments, when a new URL is identified, crawler 140 may be used to capture the screenshot of the destination webpage 120 at the identified URL and may continue on to crawl from this newly identified URL on public network 115. Crawler 140 may capture one or more screenshots of a given webpage. For example, certain size and resolution limitations may be used such that more than one screenshot may be obtained for a single returned webpage at a given URL.

In use, in some embodiments, crawler 140 may preemptively crawl public network 115 to identify unclassified destination webpages 120. Upon identifying an unclassified destination webpage 120, crawler 140 may provide the data, including at least one screenshot or image from the destination webpage 120. Webpage classifier may use other classifiers 155 to attempt to classify the destination webpage 120. Further, the images returned from crawler 140 may be submitted to embedding engine 135 to generate a subject image embedding. The subject image embedding is input to image classifier 150. The approximate nearest neighbors model 152 will return a label of the most similar image embedding in the index (e.g., closest training image embedding) and a score representing the similarity between the subject image embedding and the closest training image embedding. Image classifier 150 may compare the score with a threshold value to determine whether the subject image should be classified with the classification identified in the label. The threshold value may be, for example eighty-five (85), indicating generally that the subject image embedding and the most similar image embedding in index 154 are approximately 85% similar. A threshold value of eighty-five (85) may prove robust enough to properly classify most images while limiting false positives, however any appropriate threshold value may be used. When the score exceeds, or is equal to, the threshold value, the returned label may be applied to the subject image. When the score is below the threshold value, the label is not applied to the subject image. In some embodiments, different classifications may have a different threshold value. For example, a threshold value of ninety (90) may be used when the returned label indicates a "parked domain" class, and a threshold value of eighty (80) may be used when the returned label indicates a "gambling" class. Each threshold value may be configurable and adjusted as needed to provide optimal results. In some embodiments, a default label may be applied to the subject image when the score is below the threshold value. Image classifier 150 may apply metadata to the subject image to indicate the applied label. In other words, image classifier 150 may write metadata to the subject image or associate new metadata with the subject image that includes the classification. In some embodiments, if multiple ANN models 152 are used such that each is used for a different classification rather than including all classes in one index/ANN model combination, any label returned with a score equal to or exceeding the threshold value may be applied to the subject image, resulting in an image that has multiple labels. For example, if a first label is returned from a first ANN model with a score of eighty-seven (87) and a second label is returned from a second ANN model with a score of ninety-two (92), both the first label and the second label may be applied to the subject image. In some embodiments, only the label having the highest score that is equal to or exceeds the threshold value is applied. For example, if a first label is returned from a first ANN model with a score of eighty-seven (87) and a second label is returned from a second ANN model with a score of ninety-two (92), the second label may be applied to the subject image since it is the highest scoring label. If no labels are returned with a score exceeding (or equal to) the threshold value, a default label (e.g., "other," "default," "negative," or the like) may be applied to the subject image. Webpage classifier 145 may use the classification provided from image classifier 150 to classify the webpage. In some embodiments, the classification from image classifier 150 may be considered in combination with classifications from other classifiers 155 to determine a final classification for the webpage. Once classified, webpage classifier 145 may enter the classification information including the URL or indication of the webpage and the classification in classified domains 160.

Proxy 130 may include or be used in conjunction with one or more gateways. Proxy 130 intercepts traffic between endpoints 105 and destination webpages 120. Endpoints 105 initiate communications with destination webpages 120, and proxy 130 intercepts the traffic. Proxy 130 may be a forward proxy or a reverse proxy. In some cases, network security system 125 may be implemented such that both forward and reverse proxies are used. Proxy 130 processes the traffic for security analysis by security services in network security system 125. Responses from destination webpages 120 may be sent to proxy 130. Proxy 130 ensures the traffic undergoes security analysis by security services by submitting it for the relevant security analysis. Further proxy 130 helps ensure only traffic passing security analysis are transmitted to their intended destination (e.g., endpoints 105 or destination webpages 120).

Classified domains 160 is a listing of URLs that are classified and their corresponding classifications. Classified domains 160 may be stored or structured as a file, a database, or any other suitable storage architecture. Regardless of the structure, an indication of the webpage or website (e.g., a URL) and its corresponding classification are associated in classified domains 160 such that a search for a webpage can be used to determine whether the webpage is listed in classified domains 160 and retrieve its corresponding classification. Webpage classifier 145 may add newly classified webpages and websites (i.e., domains or URLs) to classified domains 160.

Security policy enforcement engine 165 may enforce security policies on traffic intercepted by network security system 125. For example, security policy enforcement engine 165 may receive a request destined for a destination webpage 120 having a specific URL. Security policy enforcement engine 165 may search classified domains 160 to determine whether the URL is classified, and if not, request classification by webpage classifier 145. Once classified, security policy enforcement engine 165 can apply security policies from security policy data store 170 to the requests based at least in part on the classification. For example, requests destined for webpages classified as parked domains or adult content (e.g., gambling, pornography, and the like) may be blocked, the user may be warned before proceeding, a safety score associated with the user may be modified, an administrator may be notified, or the like, or any combination may be performed by security policy enforcement engine 165. Additionally, other information beyond the classification may be used by security policy enforcement engine 165 for application of security policies or behavior of the system based on the security policies applied. For example, additional information about the user (e.g., a low safety score), the destination webpage 120 (e.g., expired certificates), or the request (e.g., inconsistent header information) may result in allowing the request, blocking the request, notifications or warnings sent in response to the request, or the like based on configuration of the applied security policies. Security policy enforcement engine 165 may access security policies from security policy data store 170, and the specific security policies implemented may be configurable based on desired responses from each client using network security system 125. Further, security policy enforcement engine 165 may perform security policy enforcement on all other traffic transmitted to network security system 125 including responses from destination webpages 120 and requests to hosted services that are classified as sanctioned.

Security policy data store 170 may store security policies used by security policy enforcement engine 165. The security policies may include those used based on website classification as well as any other security policies used for enforcing security policies by network security system 125. While website classification is discussed throughout, other security policies including other DLP security policies may be enforced with network security system 125, and request handling based in part on website classification may only be a portion of the security provided by network security system 125.

In use, endpoint 105 may request a destination webpage 120, network security system 125 may intercept the request with proxy 130. For example, endpoint routing client 110 may route the request to proxy 130. Security policy enforcement engine 165 may search classified domains 160 for the destination address of the request. If found, security policy enforcement engine 165 may use the classification for enforcement of security policies from security policy data store 170. If not found, security policy enforcement engine 165 may request classification of the destination webpage 120 by webpage classifier 145. Webpage classifier 145 may use crawler 140 to obtain data from and a screenshot of at least a portion of the destination webpage 120. Webpage classifier 145 may submit some or all of the data to other classifiers 155 for a classification. Webpage classifier 145 may also (or in response to failure of other classifiers 155 to provide a classification) submit the screenshot (which may include one or many screenshots) to embedding engine 135 to generate a subject image embedding of each submitted screenshot. The subject image embedding may be submitted to image classifier 150 for classification. ANN model 152 may search index 154 and retrieve the label of the closest training image embedding in the index and a score indicating the similarity of the subject image embedding to the closest training image embedding identified. Image classifier 150 may provide a classification based on the label and the score. For example, if the score falls below a threshold value, image classifier 150 may return no classification or a "negative" or "default" classification, in some embodiments. If the score equals or exceeds the threshold value, image classifier 150 may return the classification identified in the returned label. Webpage classifier 145 may use the classification from image classifier 150 to generate the webpage classification for the destination webpage 120. For example, if other classifiers 155 return classifications as well, webpage classifier 145 may use a scoring or weighting mechanism to classify the webpage. Once classified (or marked as unknown or default classification), webpage classifier 145 may return the classification to security policy enforcement engine 165 and enter the classification in classified domains 160. Security policy enforcement engine 165 may use the classification at least in part to apply the security policies. In some embodiments, security policy enforcement engine 165 uses the classification as information in the selected security policies. In some embodiments, security policy enforcement engine 165 may use the classification at least in part to determine which security policies to apply. Network security system 125, therefore, handles the request in accordance with application of the applicable security policies.

Various functionalities of the modules and repositories of network security system 125 will be described in use in the descriptions of the following figures.

Figure 2:
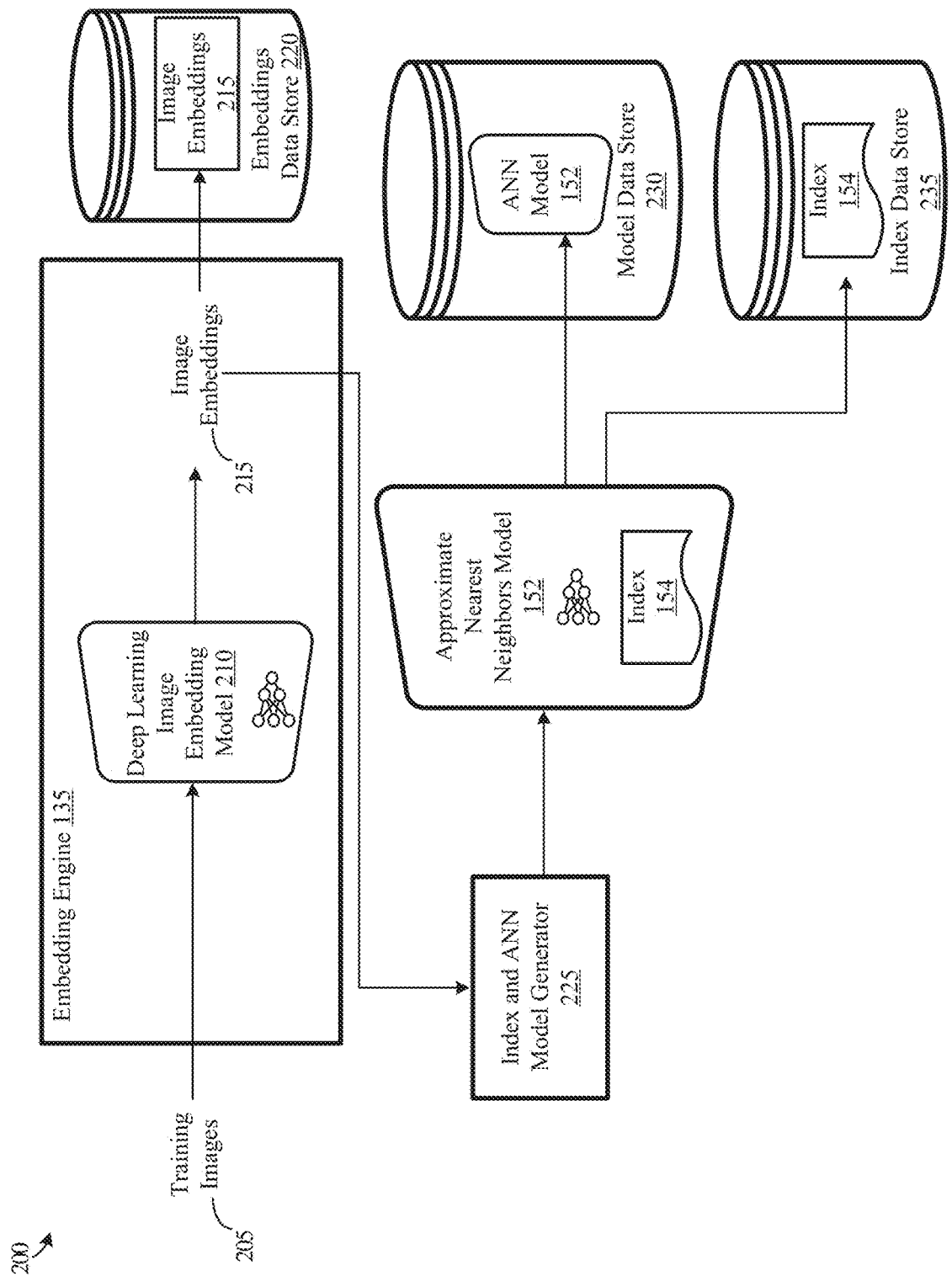
FIG. 2 illustrates training details for the image classifier of FIG. 1, according to some embodiments.

FIG. 2 illustrates a data flow 200 for generating index 154 and training ANN model 152 for use by image classifier 150. The modules and repositories shown in FIG. 2 may be included in network security system 125 or on a training platform separate from network security system 125. However, whether on a separate system or within network security system 125, embedding engine 135 is the same embedding engine used in webpage classifier 145 to ensure the training embeddings in index 154 are compatible with the subject image embeddings used when a new webpage is classified.

FIG. 2 includes embedding engine 135, embeddings data store 220, index and ANN model generator 225, approximate nearest neighbors model 152 and index 154, model data store 230, and index data store 235. In some embodiments, these models, modules, and repositories are in network security system 125, in a training platform, or both.

Embedding engine 135 includes deep learning image embedding model 210, both of which are described in detail with respect to FIG. 1. Embedding engine 135 uses deep learning image embedding model 210 to ingest a subject image or training images 205. Each ingested image is analyzed and an image embedding representing the ingested image is generated by deep learning image embedding model 210.

Embeddings data store 220 may store image embeddings 215 generated by embedding engine 135. Some image embeddings 215 may be stored for later use including the image embeddings 215 used to generate any of the described indexes (e.g., index 154). The image embeddings 215 may be used later to generate new indexes of different groupings of the image embeddings 215, for example. In other words, different clusters within the index may be used for different classifications of the images. While some image embeddings 215 may be stored, not every image embedding 215 may be stored in some embodiments. For example, training image embeddings may be stored, but subject image embeddings may be discarded.

Index and ANN model generator 225 generates indexes and their corresponding approximate nearest neighbors (ANN) models, and functions of index and ANN model generator 225 are described in more detail with respect to FIG. 1. Index and ANN model generator 225 obtains image embeddings 215 from embeddings data store 220 and forms an index (e.g., index 154) of the image embeddings 215. Index and ANN model generator 225 clusters the image embeddings 215 and applies labels to the clusters of image embeddings 215. For example, image embeddings of images of parked domain webpage screenshots are clustered labeled with a parked domain classification, image embeddings of images of gambling webpage screenshots are clustered labeled with a gambling classification, and image embeddings of images of pornography webpage screenshots are clustered labeled with a pornography classification. Other classifications may be used as well including, for example, dark web classifications, trading web classifications, child-friendly classifications, child-inappropriate classifications, virus-likely classifications, or any other specific classification type desired. The ANN models are generated specifically for a given index. Accordingly, index 154 and ANN model 152 are particularly associated with each other to generate results. Index and ANN model generator 225 generates ANN model 152 and trains it to obtain a closest image embedding 215 from index 154 to a submitted subject image embedding. ANN model 152 may be trained to obtain the associated label from the closest image embedding and generate a similarity score representing the similarity between the identified closest image embedding and the submitted subject image embedding. The score may be normalized to a value between zero (0) and one hundred (100) such that it may be thought of as a percentage similarity. For example, a score of ninety (90) may indicate that the subject image represented by the subject image embedding and the training image represented by the identified closest image embedding are ninety percent (90%) similar. As discussed with respect to FIG. 1, the image classifier may use the score to determine whether to apply the classification indicated in the identified label of the closest image embedding to the subject image. Given any number of image embeddings 215, index and ANN model generator 225 may generate any number of indexes 154 and associated ANN models 152 such that each index 154 and associated ANN model 152 may be used for various classifications. In the case where index 154 includes multiple clusters, any of the classifications represented by the cluster may be applied. In some embodiments, multiple index 154 and associated ANN model 152 can be used to apply multiple labels to the same subject image by submitting the subject image embedding to more than one ANN model 152.

Model data store 230 may store models including deep learning image embedding models (e.g., deep learning image embedding model 210 included in embedding engine 135), approximate nearest neighbors models (e.g., approximate nearest neighbors model 152), and the like. Model data store 230 may be a portion of a larger data store that stores other items or only used for storing models.

Index data store 235 may store indexes generated by index and ANN model generator 225. When replacement indexes are generated, such as, for example, when a new classifier is trained, the old index may be retained in index data store 235 in some embodiments. In other embodiments, the old index may be deleted.

Model data store 230, embeddings data store 220, and index data store 235 are described as individual data stores but may be combined in any combination. Further, there may be a training data store (not shown) in which training images are retained or temporarily stored. In some embodiments, crawler 140 may be used to obtain the training images.

The training data store may store image data sets that are used for training deep learning models including image embedding model 210 and training image classifiers like image classifier 150 by using the image embeddings of the images for generating index 154 and ANN model 152. The training data store may store historical information about training data sets without maintaining the entire image data set over time. In some embodiments, the training data store may be used for staging image data sets for training, and the images may be deleted after image embeddings 215 are generated or training is complete. In some embodiments, image data sets that are used to train image classifier 150 are stored in the training data store. In some embodiments, temporary storage is used for staging all image data sets.

In use, training images 205 may be obtained (e.g., from a training data store) and submitted to embedding engine 135. Embedding engine 135 inputs training images 205 into deep learning image embedding model 210 to generate image embeddings 215 from the images. Image embeddings 215 may be stored in embeddings data store 220. Image embeddings 215 may also be input to index and ANN model generator 225. In some embodiments, index and ANN model generator 225 receives or retrieves some or all image embeddings 215 from embedding engine 135 or embeddings data store 220. Index and ANN model generator 225 may index the image embeddings 215 and generate any relevant clusters and apply the relevant labels to the indexed image embeddings 215 based on their clusters. For example, index and ANN model generator 225 may apply a specific label indicating the relevant classification to each image embedding 215 in an embedding cluster. Index and ANN model generator 225 may further apply a negative or default label to all image embeddings 215 representing negative images (i.e., images that are not in one of the selected classifications). Once ANN index 154 is created, index and ANN model generator 225 trains approximate nearest neighbors (ANN) model 152 to use ANN index 154 to identify the most similar image embedding from the indexed image embeddings 215 to an image embedding of a subject image embedding input into ANN model 152. Once generated and trained, index and ANN model generator 225 may store ANN model 152 into model data store 230 and ANN index 154 in index data store 235. ANN index 154 and associated ANN model 152 are now ready to be used by image classifier 150.

Figure 3:
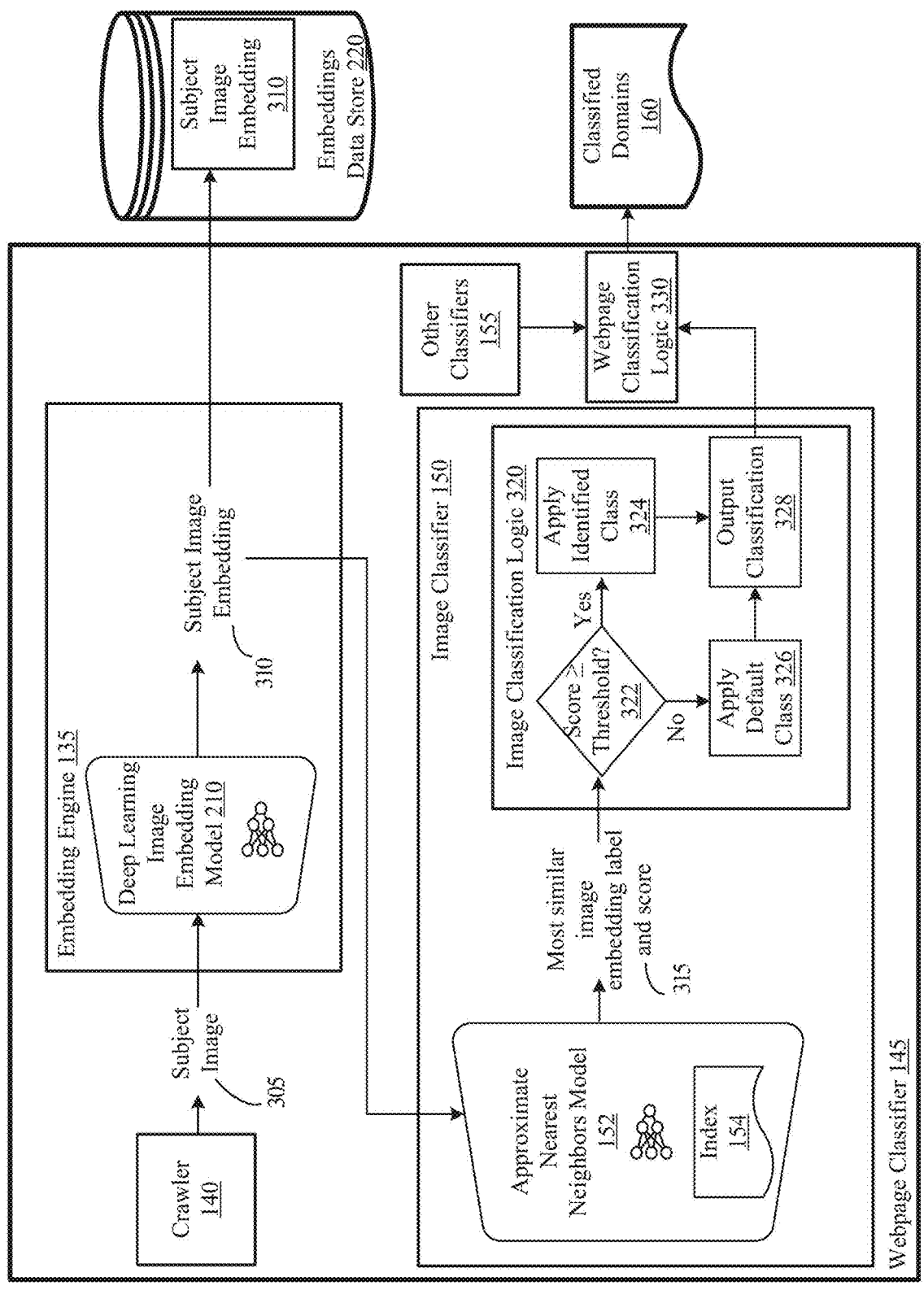
FIG. 3 illustrates data flow and details of classifying a webpage with the webpage classifier of FIG. 1, according to some embodiments.

FIG. 3 illustrates a data flow 300 for using webpage classifier 145. Crawler 140 may collect a screenshot of at least a portion of a webpage or extract images displayed on a webpage and submit each as a subject image 305 to embedding engine 135. Crawler 140 may collect the data, images, and screenshots as part of routine crawling to identify and classify webpages not previously classified or in response to a specific request (e.g., when a client device sends a request to an unclassified destination webpage 120). Embedding engine 135 inputs subject image 305 into deep learning image embedding model 210 to generate subject image embedding 310. In some embodiments, webpage classifier 145 transmits subject image embedding 310 to embeddings data store 220 for storage. Webpage classifier 145 inputs subject image embedding 310 into ANN model 152, which is trained to identify the most similar image embedding in ANN index 154 to subject image embedding 310 and generate a score representing the similarity. The score may represent a proportional mapping of an angular distance between the most similar image embedding and subject image embedding 310. The score, therefore, represents the differences between the two embeddings or may be viewed as a similarity between the two images. ANN model 152 outputs the most similar image embedding and score 315. Image classifier 150 uses image classification logic 320 to determine whether subject image 305 should be classified with the classification in the returned label based on the score. Image classification logic 320 may compare the score with a threshold value and determine at 322 if the score exceeds or is equal to the threshold value. If the score is greater than or equal to the threshold value, at 324 image classification logic 320 applies the classification in the identified label to subject image 305. If the score is less than the threshold value, at 326 image classification logic 320 applies a default classification to subject image 305. The default classification may include any relevant default classification such as "default," "none," "no class," "negative," or the like. At 328, image classification logic 320 outputs the relevant classification. Note that in some cases, multiple images are captured from a single webpage by crawler 140. For example, multiple images displayed on the webpage may be downloaded, more than one screenshot may be captured of different portions of the webpage, or a combination. Each image may be separately classified by image classifier 150, and each classification may be returned to webpage classifier 145. Webpage classifier 145 classifies the webpage using webpage classification logic 330. While image classifier 150 is classifying subject image(s) 305, other classifiers 155 may also be generating classifications based on other data captured from crawler 140 including text, audio, video, or the like. Other classifiers 155 may submit their output classifications to webpage classification logic 330 as well, and webpage classification logic 330 may use the various classification results from other classifiers 155 and image classifier 150 for classifying the webpage. For example, each classifier may have a weight associated with it such that a successful classification from a highest weighted classifier may be used. As another example, if multiple classifications result in the same or similar classification, webpage classification logic 330 may classify the webpage with the classification returned by the most classifiers. Any suitable weighting or ordering logic may be implemented by webpage classification logic 330. In embodiments where multiple images from the same webpage are classified by image classifier 150, webpage classification logic 330 may use the same type of weighting or ordering logic to determine the webpage class. Once classified, webpage classifier 145 may insert an entry for the webpage and its associated classification into classified domains 160. For example, the URL of the webpage and its classification may be entered into classified domains 160.

Figure 4:
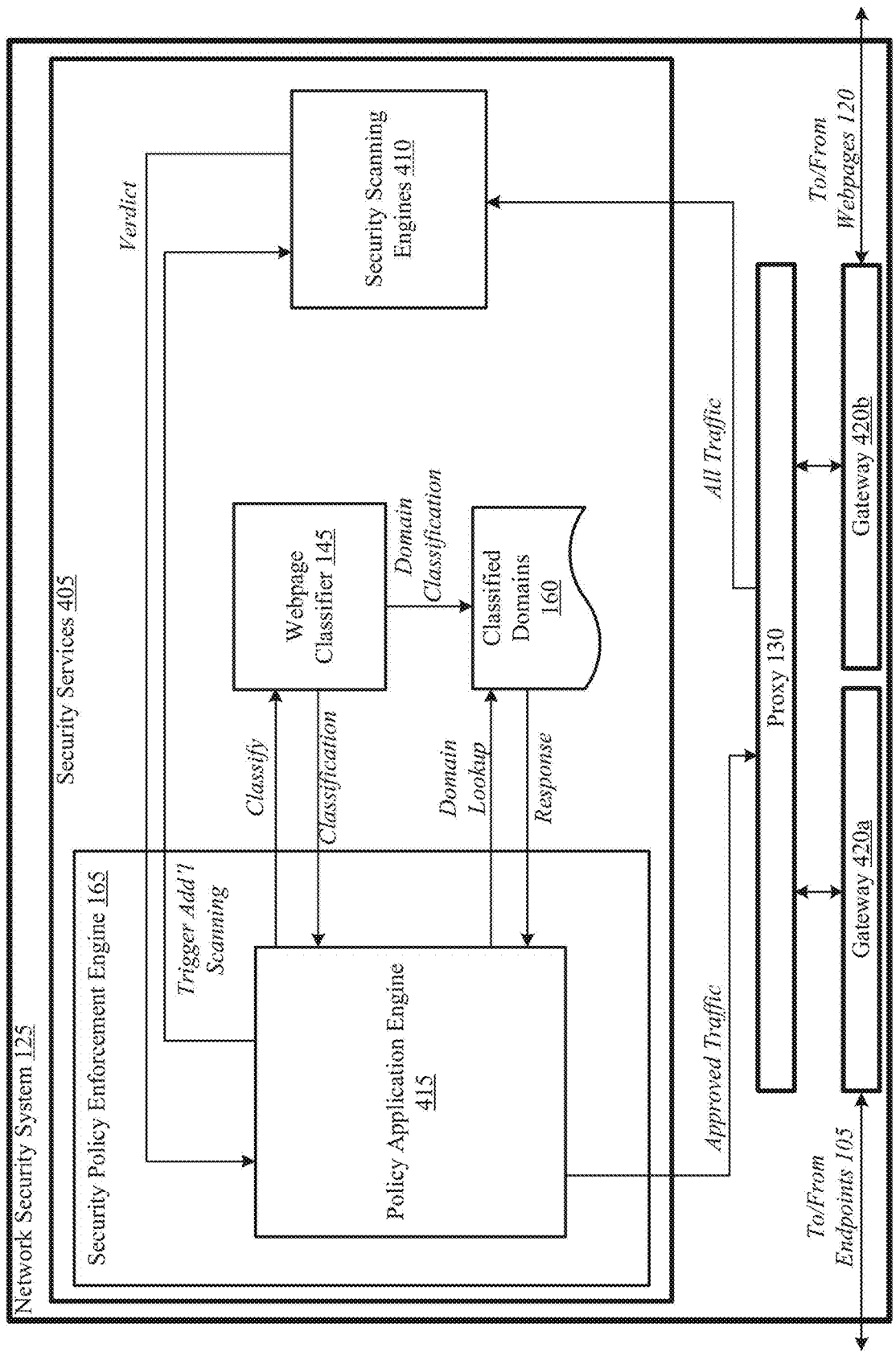
FIG. 4 illustrates data flow and details of the network security system of FIG. 1, according to some embodiments.

FIG. 4 illustrates a data flow and details of network security system 125. Network security system 125 includes gateway 420*a* and gateway 420*b* (collectively gateways 420), proxy 130, and security services 405. Gateway 420*a* intercepts traffic from endpoints 105 directed to destination webpages 120 and transmits approved traffic from destination webpages 120 directed to endpoints 105. Gateway 420*b* intercepts traffic from destination webpages 120 directed to endpoints 105 and transmits approved traffic from endpoints 105 directed to destination webpages 120. Proxy 130 communicates with gateways 420 as the termination point for communication sessions between endpoints 105 and destination webpages 120. Proxy 130 may be a forward proxy, meaning it intercepts traffic based on endpoints 105 implementing the security services 405 of network security system 125, or a reverse proxy, meaning it intercepts traffic from all endpoints 105 directed to a specific destination webpage 120, which implements the security services 405 of network security system 125, or both. Network security system 125 may be, for example, an instance of a cloud-based network security service (network security system 125) implemented for a particular enterprise to which endpoints 105 belong. Multiple instances of network security system 125 may be implemented, each for one client (e.g., one enterprise). In some embodiments, network security system 125 may be implemented to provide cloud-based network security services to many clients, and each client may have distinct gateways 420 and proxy 130 such that network security system 125 includes multiple gateways 420 and proxies 130. In some embodiments, a single instance of security services 405 performs security analysis on traffic for all clients. The security analysis and webpage classification functionality described is not dependent on the implementation details of one or more clients.

Security services 405 includes security scanning engines 410, security policy enforcement engine 165, webpage classifier 145, and classified domains listing 160. Security services 405 may include more or fewer modules than those depicted in FIG. 4 to implement the described functionality without departing from the scope and spirit of the present disclosure. Further, security services 405 may provide additional functionality not described here for the sake of simplicity.

Security scanning engines 410 may perform security scanning of traffic including data loss prevention (DLP) scanning, threat scanning, and the like. Security scanning engines 410 may perform initial scanning on all traffic and provide a verdict to security policy enforcement engine 165. Additional scanning may be requested by policy application engine 415 after webpage classification is completed or other security policies are applied.

Security policy enforcement engine 165 receives results (e.g., classifications and verdicts) from security scanning engines 410 and classified domains 160 based on a lookup performed by policy application engine 415. Based on the classification or verdict, policy application engine 415 applies security policies to route traffic for further scanning, generate outputs such as administrator or user alerts, approve traffic for transmission to its intended destination, and the like.

Security policy enforcement engine 165 may receive a request from security scanning engines 410 including any initial verdicts. Policy application engine 415 may perform a domain lookup of the relevant URL of the webpage identified as the destination in the request in classified domains 160. Classified domains 160 provides a response, which may indicate the URL or webpage was found along with a classification or that indicates the URL or webpage is not found. If not found, policy application engine 415 may request classification by webpage classifier 145. Webpage classifier 145 may classify the webpage, which is described in more detail with respect to FIG. 3. Webpage classifier 145 may enter the information in classified domains 160 for future use and return the classification to policy application engine 415. Policy application engine 415 may use the classification when retrieved from either classified domains 160 or webpage classifier 145 to apply security policies to the request. Policy application engine 415 may, in response to applying security policies, request further scanning from security scanning engines 410, modify a safety score associated with the user, issue warning messages to the user or an administrator, issue coaching messages to the user, block the request, or perform any other suitable security measure. In some embodiments, multiple security measures are performed (e.g., user safety score modified and warning issued). The user safety score may be a score associated with a user that indicates whether the user is engaging in unsafe behavior and the frequency of such behavior such that a score that passes a threshold value may result in locking of a user account or other security measures. Once policies are applied by policy application engine 415 to the request, if approved, the request is sent to proxy 130 for routing to the appropriate destination webpage 120.

Figure 5:
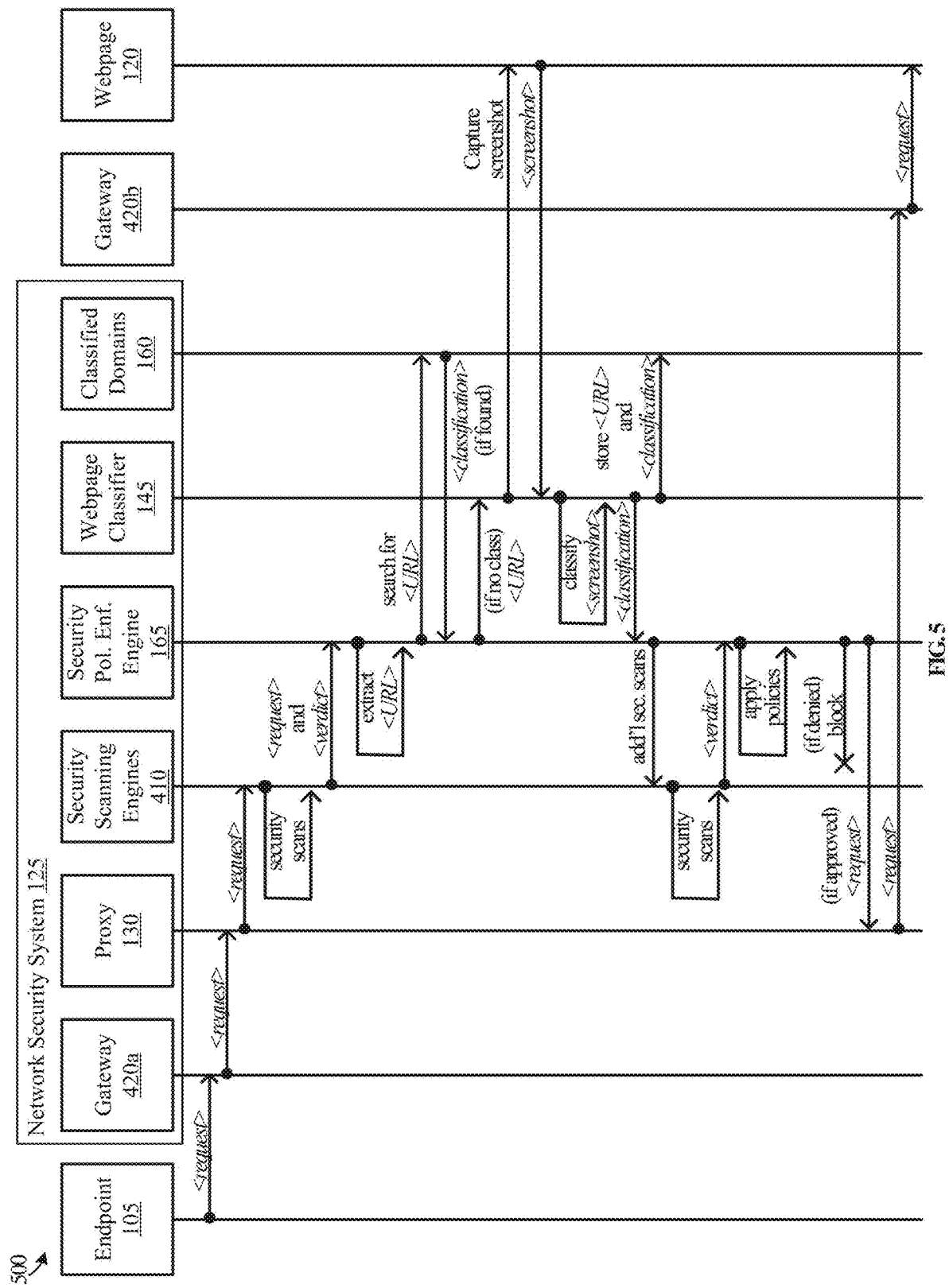
FIG. 5 illustrates a swim diagram illustrating data flow for enforcing policies on a request based on webpage classification, according to some embodiments.

FIG. 5 illustrates a swim diagram 500 of routing of a request from an endpoint 105 to webpage 120 through network security system 125. Endpoint 105 routes the request to gateway 420*a* and thereby proxy 130, for example, using endpoint routing client 110. Proxy 130 routes the request to security scanning engines 410 for initial securing scans, and security scanning engines 410 send the request and any verdicts to security policy enforcement engine 165. Security policy enforcement engine 165 may need to extract the destination URL from the request and search classified domains 160 for an entry. The classification may be identified in classified domains 160, however, if no entry for the relevant destination webpage is found in classified domains, security policy enforcement engine 165 may request webpage classifier 145 classify the webpage. Webpage classifier may obtain a screenshot from webpage 120, for example, using crawler 140. Webpage classifier 145 may classify the screenshot using image classifier 150. Webpage classifier 145 may return the classification to security policy enforcement engine 165 and store the URL and classification in classified domains 160. Security policy enforcement engine 165 may trigger additional security scans from security scanning engines 410, which will return any relevant verdicts to security policy enforcement engine 165. Security policy enforcement engine 165 applies relevant security policies based at least in part on the classification of the webpage. If the security policies require security policy enforcement engine to block the request, it is blocked. Otherwise, if approved, security policy enforcement engine routes the request to proxy 130. Proxy 130 routes the request to gateway 420b for delivery to webpage 120.

Figure 6:
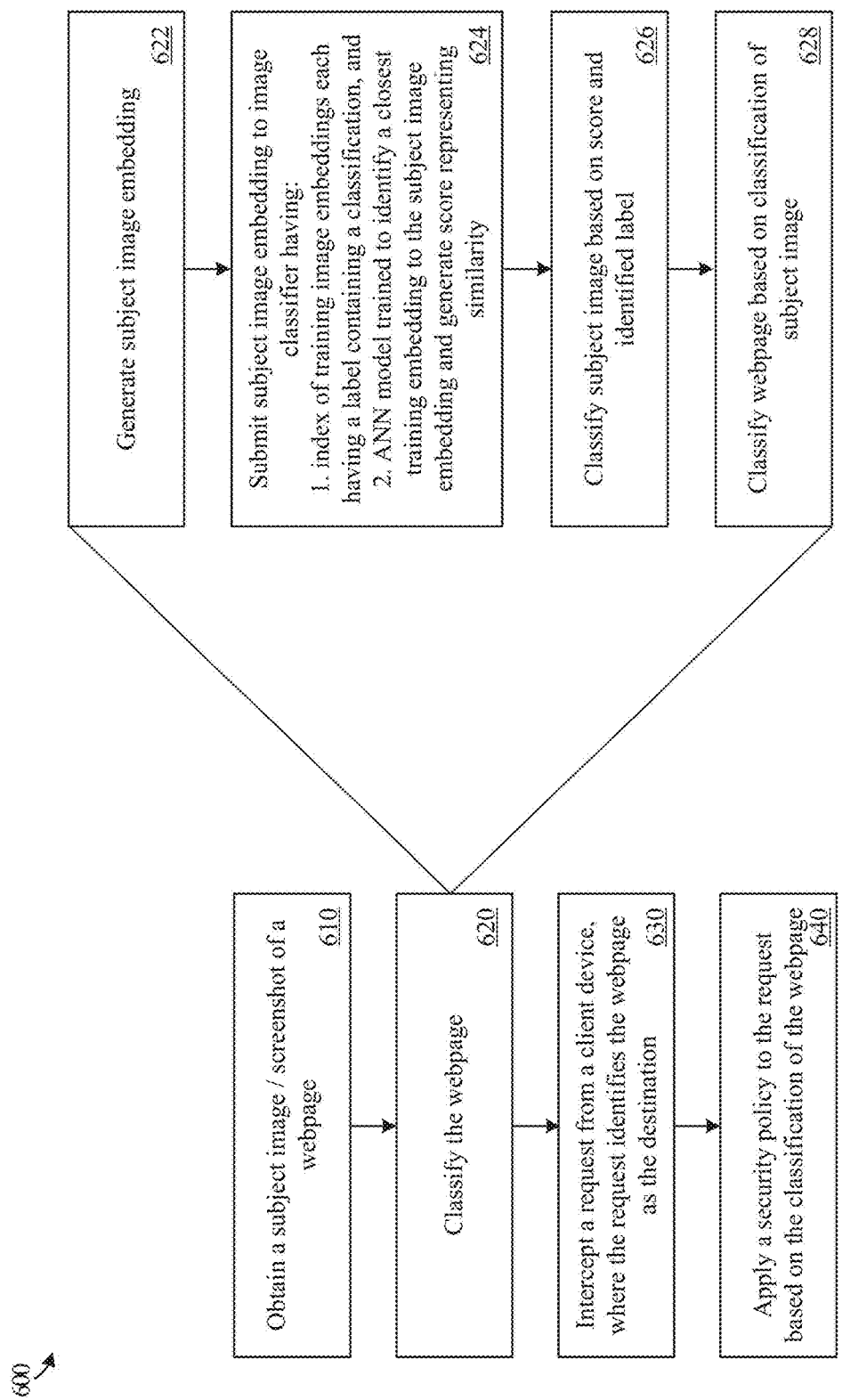
FIG. 6 illustrates a method of classifying a webpage and enforcing a security policy on a request destined for the webpage based on the classification, according to some embodiments.

FIG. 6 illustrates method 600 for webpage classification and security policy enforcement based at least in part on the classification using a network security system such as network security system 125. The steps of method 600 need not be performed in the order depicted in some embodiments, and the components performing the method steps may differ from those described in the description below. Method 600 begins at 610 with, for example, crawler 140 obtaining a subject image, which may be one or more images obtained from a webpage or a screenshot of at least a portion of the webpage.

At 620, method 600 continues with classifying the webpage. The webpage is classified with webpage classifier 145 as described with respect to FIG. 3 and further here. Webpage classifier 145 generates a subject image embedding using embedding engine 135 at step 622. At step 624, the subject image embedding is submitted to image classifier 150, which includes ANN model 152 and index 154. As discussed above, index 154 includes an index of training image embeddings each labeled with a classification. Index 154 may include negative training image embeddings and clusters of training image embeddings all classified with a specific classification label such as parked domain, gambling, pornography, or the like. Further ANN model 152 is trained to identify the closest training image embedding to the subject image embedding in index 154 and return the label associated with the closest training image embedding and a score representing the similarity between the subject image embedding and the closest training image embedding identified. At step 626, image classifier 150 classifies the subject image based on the identified label and score returned by ANN model 152. At step 628, webpage classifier 145 classifies the webpage based at least in part on the classification of the subject image returned from image classifier 150.

At 630, network security system 125 intercepts a request from a client device intended for a destination webpage, which is identified in the request with a URL. For example, an endpoint 105 may issue the request and an endpoint routing client 110 on endpoint 105 routes the request to proxy 130 for security analysis.

At 640, network security system 125 applies a security policy to the request based at least in part on the classification of the webpage 640. Network security system 125 may use policy application engine 415 to determine the classification from classified domains 160 or webpage classifier 145 if the classification was not previously performed. Once classified, policy application engine 415 may apply one or more security policies that consider the classification of the webpage to determine how to handle the request including transmitting notifications to an administrator, transmitting notifications (e.g., counseling or warning messages) to the user of endpoint 105, blocking the request, modifying the request, modifying a safety score of the user of endpoint 105, and/or performing any other suitable security measures based on the classification of the webpage. Other security measures may also be performed based on other information related to the user, the webpage, or the request.

The steps of method 600 may be performed in a different order than that described including some steps being performed in parallel, in some embodiments. Further, method 600 may include more steps than those described.

Figure 7:
FIG. 7 illustrates an exemplary screenshot of a webpage classified as gambling, according to some embodiments.

FIG. 7 illustrates an exemplary screenshot 700 of a gambling webpage, which may be classified as a gambling webpage by webpage classifier 145 based on image classifier 150 classification of screenshot 700. As shown, the various and busy images shown in screenshot 700 indicate the variety of information and lack of textual, audio, or video data available on the webpage depicted by screenshot 700. In some embodiments, screenshot 700 may be captured by crawler 140, and may be only a portion of the webpage. Crawler 140 may be configured to capture screenshots of portions of a webpage based on resolution, size, and/or any other criteria. Further, analyzing the webpage may show that various sections of the webpage are each an image, and the individual images may be downloaded by crawler 140 and each independent image may be classified to provide multiple classifications from image classifier 150 for a single webpage, and webpage classifier 145 may use the combination of classifications to classify the webpage overall. Screenshot 700 illustrates that many different colors, types of depictions, and data may be used that make classification of the webpage challenging. As shown, screenshot 700 includes little consistency in color, data, text, and depictions, and screenshot 700 is representative of many types of websites that may be unsavory or unsuitable for business purposes or that may be likely to lead to viruses.

Figure 8:
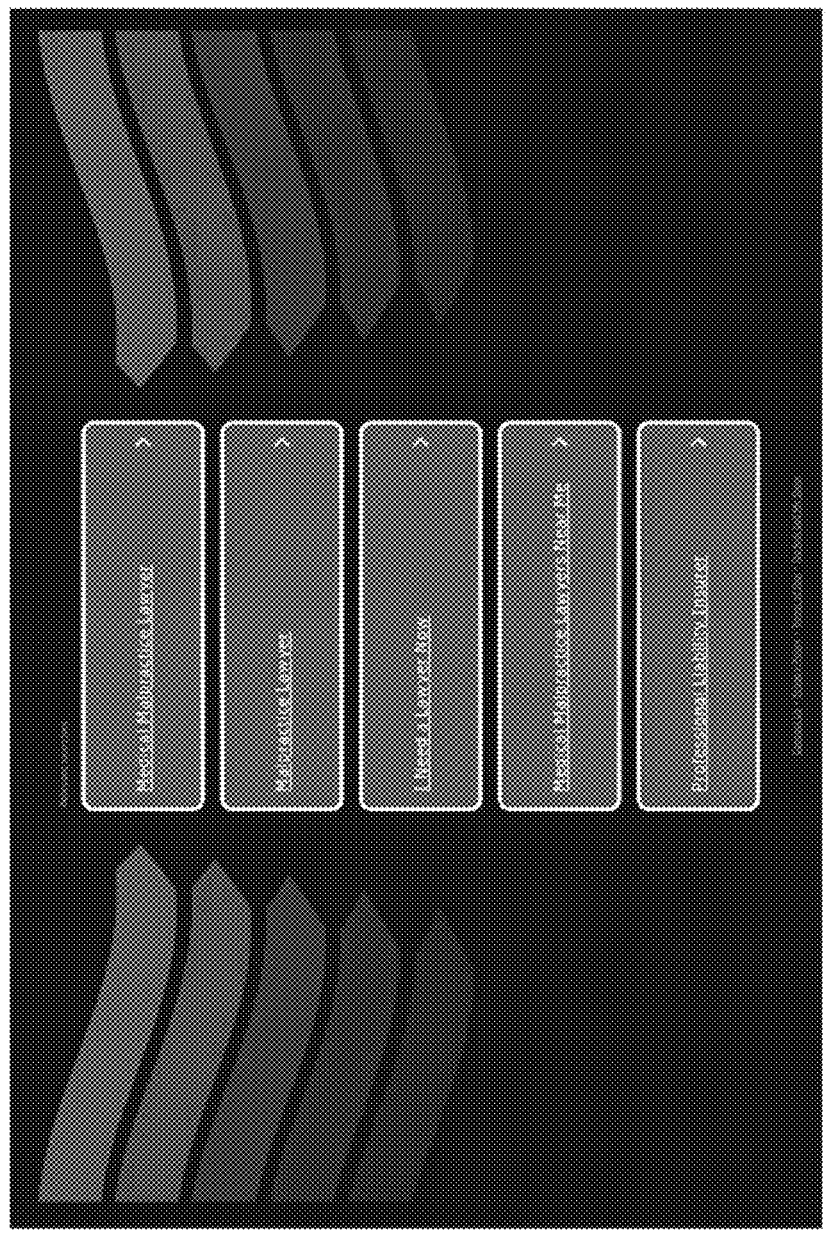
FIG. 8 illustrates an exemplary screenshot of a webpage classified as parked domain, according to some embodiments.

FIG. 8 illustrates an exemplary screenshot 800 of a parked domain webpage, which may be classified as a parked domain webpage by webpage classifier 145 based on image classifier 150 classification of screenshot 800. As shown, there is nothing distinguishing about this webpage. Any color could be used, any background design could be used, text displayed could include any type of advertising, and so forth. While screenshot 800 uses blue throughout, any color or combination of colors may be used for such a webpage. Accordingly, nothing about the data, text, depictions, designs, or color is distinguishing for parked domain websites, which makes classification of the webpage challenging. Screenshot 800 is representative of many types of websites that may be unsavory or unsuitable for business purposes or that may be likely to lead to viruses. Further, nothing about screenshot 700 and screenshot 800 provide similarities helpful for classifying both types of websites, despite them both being undesirable to access by users. Such depictions of screenshot 700 and screenshot 800 illustrate the difficulty of classification of webpages with traditional classifiers such as text-based classifiers or traditional image classifiers. Nonetheless, image classifier 150 in combination with webpage classifier 145 as described herein are capable of accurately classifying the webpages behind screenshot 700 and screenshot 800 accurately.

Figure 9:
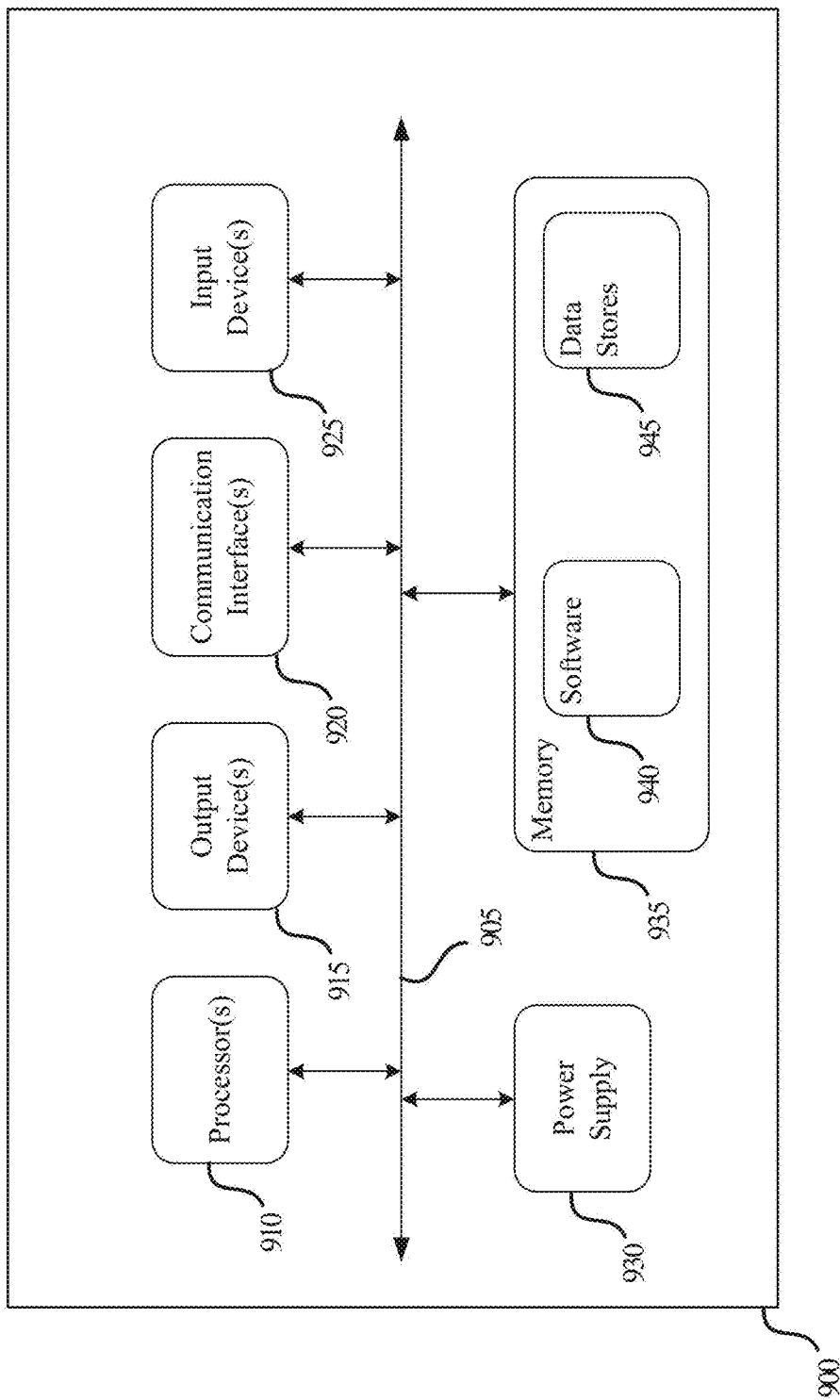
FIG. 9 illustrates an exemplary computing system, according to some embodiments.

FIG. 9 illustrates a computing device 900. The computing device 900 includes various components not included for ease of description in other computing devices discussed herein including, for example, endpoints 105, network security system 125, and servers that serve destination webpages 120. Accordingly, computing device 900 may be endpoints 105, network security system 125, or servers that serve destination webpages 120 by incorporating the functionality described in each.

Computing device 900 is suitable for implementing processing operations described herein related to security enforcement, image classification, and webpage classification with which aspects of the present disclosure may be practiced. Computing device 900 may be configured to implement processing operations of any component described herein including the user system components (e.g., endpoints 105 of FIG. 1). As such, computing device 900 may be configured as a specific purpose computing device that executes specific processing operations to solve the technical problems described herein including those pertaining to security enforcement, image classification, and webpage classification. Computing device 900 may be implemented as a single apparatus, system, or device or may be implemented in a distributed manner as multiple apparatuses, systems, or devices. For example, computing device 900 may comprise one or more computing devices that execute processing for applications and/or services over a distributed network to enable execution of processing operations described herein over one or more applications or services. Computing device 900 may comprise a collection of devices executing processing for front-end applications/services, back-end applications/services, or a combination thereof. Computing device 900 includes, but is not limited to, a bus 905 communicably coupling processors 910, output devices 915, communication interfaces 920, input devices 925, power supply 930, and memory 935.

Non-limiting examples of computing device 900 include smart phones, laptops, tablets, PDAs, desktop computers, servers, blade servers, cloud servers, smart computing devices including television devices and wearable computing devices including VR devices and AR devices, e-reader devices, gaming consoles and conferencing systems, among other non-limiting examples.

Processors 910 may include general processors, specialized processors such as graphical processing units (GPUs) and digital signal processors (DSPs), or a combination. Processors 910 may load and execute software 940 from memory 935. Software 940 may include one or more software components such as webpage classifier 145, proxy 130, security policy enforcement engine 165, image classifier 150, other classifiers 155, embedding engine 135, crawler 140, endpoint routing client 110, or any combination including other software components. In some examples, computing device 900 may be connected to other computing devices (e.g., display device, audio devices, servers, mobile/remote devices, VR devices, AR devices, etc.) to further enable processing operations to be executed. When executed by processors 910, software 940 directs processors 910 to operate as described herein for at least the various processes, operational scenarios, and sequences discussed in the foregoing implementations. Computing device 900 may optionally include additional devices, features, or functionality not discussed for purposes of brevity. For example, software 940 may include an operating system that is executed on computing device 900. Computing device 900 may further be utilized as endpoints 105 or any of the cloud computing systems in system 100 (FIG. 1) including network security system 125 or may execute the method 400 of FIG. 4, the process shown in swim diagram 500 of FIG. 5, or any combination.

Referring still to FIG. 9, processors 910 may include a processor or microprocessor and other circuitry that retrieves and executes software 940 from memory 935. Processors 910 may be implemented within a single processing device but may also be distributed across multiple processing devices or sub-systems that cooperate in executing program instructions. Examples of processors 910 include general purpose central processing units, microprocessors, graphical processing units, application specific processors, sound cards, speakers and logic devices, gaming devices, VR devices, AR devices as well as any other type of processing devices, combinations, or variations thereof.

Memory 935 may include any computer-readable storage device readable by processors 910 and capable of storing software 940 and data stores 945. Data stores 945 may include security policy data store 170, embeddings data store 220, model data store 230, index data store 235, classified domains 160, or any combination thereof. Memory 935 may include volatile and nonvolatile, removable and non-removable media implemented in any method or technology for storage of information, such as computer readable instructions, data structures, program modules, cache memory, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer-readable storage device a propagated signal.

In addition to computer-readable storage devices, in some implementations, memory 935 may also include computer-readable communication media over which at least some of software 940 may be communicated internally or externally. Memory 935 may be implemented as a single storage device but may also be implemented across multiple storage devices or sub-systems co-located or distributed relative to each other. Memory 935 may include additional elements, such as a controller, capable of communicating with processors 910 or possibly other systems.

Software 940 may be implemented in program instructions and among other functions may, when executed by processors 910, direct processors 910 to operate as described with respect to the various operational scenarios, sequences, and processes illustrated herein. For example, software 940 may include program instructions for executing image fingerprinting, image matching, image classifying, image embedding conversion, or security policy enforcement as described herein.

In particular, the program instructions may include various components or modules that cooperate or otherwise interact to conduct the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 940 may include additional processes, programs, or components, such as operating system software, virtual machine software, or other application software. Software 940 may also include firmware or some other form of machine-readable processing instructions executable by processors 910.

In general, software 940 may, when loaded into processors 910 and executed, transform a suitable apparatus, system, or device (of which computing device 900 is representative) overall from a general-purpose computing system into a special-purpose computing system customized to execute specific processing components described herein as well as process data and respond to queries. Indeed, encoding software 940 on memory 935 may transform the physical structure of memory 935. The specific transformation of the physical structure may depend on various factors in different implementations of this description. Examples of such factors may include, but are not limited to, the technology used to implement the storage media of memory 935 and whether the computer-storage media are characterized as primary or secondary storage, as well as other factors.

For example, if the computer readable storage device is implemented as semiconductor-based memory, software 940 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interfaces 920 may include communication connections and devices that allow for communication with other computing systems (not shown) over communication networks (not shown). Communication interfaces 920 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication interfaces 920 may also include associated user interface software executable by processors 910 in support of the various user input and output devices discussed below. Separately or in conjunction with each other and other hardware and software elements, the user interface software and user interface devices may support a graphical user interface, a natural user interface, or any other type of user interface, for example, that enables front-end processing and including rendering of user interfaces, such as a user interface that is used by a user on endpoint 105. Exemplary applications/services may further be configured to interface with processing components of computing device 900 that enable output of other types of signals (e.g., audio output, handwritten input) in conjunction with operation of exemplary applications/services (e.g., a collaborative communication application/service, electronic meeting application/service, etc.) described herein.

Input devices 925 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices 915 may include a display, speakers, haptic devices, and the like. In some cases, the input and output devices may be combined in a single device, such as a display capable of displaying images and receiving touch gestures. The aforementioned user input and output devices are well known in the art and need not be discussed at length here.

Communication between computing device 900 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

The computing device 900 has a power supply 930, which may be implemented as one or more batteries. The power supply 930 may further include an external power source, such as an AC adapter or a powered docking cradle that supplements or recharges the batteries. In some embodiments, the power supply 930 may not include batteries and the power source may be an external power source such as an AC adapter.

The aforementioned discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

What is claimed is:

1. A computer-implemented method, comprising:
   obtaining a subject image comprising a screenshot of a webpage associated with a uniform resource locator;
   classifying the webpage, the classifying comprising:
      generating a subject image embedding of the subject image,
      submitting the subject image embedding to an image classifier, wherein the image classifier comprises:
         an index of training image embeddings, wherein the training image embeddings each comprise a label containing a classification of a training image associated with the respective training image embedding; and
         an approximate nearest neighbors model trained to identify the label of a closest training image embedding to the subject image embedding and a score representing a similarity of the subject image embedding to the closest training image embedding,
      classifying the subject image based on the score and the label identified by the approximate nearest neighbors model, and
      classifying the webpage based on the classification of the subject image;
   intercepting a request from a client device, wherein the request identifies the uniform resource locator as a destination; and
   applying a security policy to the request based at least in part on the classification of the webpage.

2. The computer-implemented method of claim 1, wherein the obtaining the subject image comprises:
   using a crawler to capture the screenshot.

3. The computer-implemented method of claim 1, further comprising:
   storing the uniform resource locator and the classification of the webpage in a classified domains listing.

4. The computer-implemented method of claim 3, further comprising:
   subsequent to intercepting the request, searching the classified domains listing for the uniform resource locator identified as the destination in the request; and
   in response to finding the uniform resource locator in the classified domains listing, identifying the classification of the webpage associated with the uniform resource locator in the classified domains listing.

5. The computer-implemented method of claim 3, further comprising:
   subsequent to intercepting the request, searching the classified domains listing for the uniform resource locator identified as the destination in the request; and
   in response to not finding the uniform resource locator in the classified domains listing, capturing the screenshot of the webpage.

6. The computer-implemented method of claim 1, further comprising:
   applying one or more other classifiers to at least a portion of a content of the webpage, wherein the classifying the webpage based on the classification of the subject image is performed in response to the one or more other classifiers failing to classify the webpage.

7. The computer-implemented method of claim 1, further comprising:
   generating the training image embeddings with an embedding engine.

8. The computer-implemented method of claim 1, wherein the index comprises:
   one or more embedding clusters, wherein each of the one or more embedding clusters comprises a subset of the training image embeddings associated with training images having a same classification contained in its respective label; and
   a negative subset of the training image embeddings comprising training image embeddings of negative training images each having the label containing a default classification.

9. The computer-implemented method of claim 8, wherein:
   a first embedding cluster is labeled with a gambling classification;
   a second embedding cluster is labeled with a parked domain classification; and
   a third embedding cluster is labeled with a pornography classification.

10. The computer-implemented method of claim 1, wherein the classifying the subject image based on the score and the identified label comprises:
    in response to a determination that the score is equal to or exceeds a threshold value, classifying the subject image with the identified label; and
    in response to a determination that the score is below the threshold value, classifying the subject image with a default label.

11. A network security system, comprising:
    an embedding engine configured to:
       receive a subject image comprising a screenshot of a webpage associated with a uniform resource locator, and
       generate a subject image embedding of the subject image;
    an image classifier, comprising:
       an index of training image embeddings, wherein the training image embeddings each comprise a label containing a classification of a training image associated with the respective training image embedding, and
       an approximate nearest neighbors model trained to identify the label of a closest training image embedding to the subject image embedding and a score representing a similarity of the subject image embedding to the closest training image embedding,
wherein the image classifier is configured to classify the subject image based on the score and the label identified by the approximate nearest neighbors model;
a webpage classifier configured to classify the webpage based on the subject image classification;
a proxy configured to:
intercept a request from a client device, wherein the request identifies the uniform resource locator as a destination; and
a security policy enforcement engine configured to:
apply a security policy to the request based at least in part on the classification of the webpage.

12. The network security system of claim 11, further comprising:
a crawler configured to capture the screenshot of the webpage.

13. The network security system of claim 11, wherein the webpage classifier is further configured to:
store the uniform resource locator and the classification of the webpage in a classified domains listing.

14. The network security system of claim 13, wherein the security policy enforcement engine is further configured to:
subsequent to receiving the request, search the classified domains listing for the uniform resource locator of the webpage identified as the destination in the request; and
in response to finding the uniform resource locator in the classified domains listing, identify the classification of the webpage associated with the uniform resource locator in the classified domains listing.

15. The network security system of claim 13, wherein the security policy enforcement engine is further configured to:
subsequent to receiving the intercepted request, search the classified domains listing for the uniform resource locator identified as the destination in the request; and
in response to not finding the uniform resource locator in the classified domains listing, obtain the screenshot of the webpage.

16. The network security system of claim 11, further comprising:
one or more other classifiers configured to classify the webpage based on at least a portion of a content of the webpage;
wherein the webpage classifier is further configured to classify the webpage based on the subject image classification in response to the one or more other classifiers failing to classify the webpage.

17. The network security system of claim 11, further comprising:
an image classifier trainer configured to:
submit training images to the embedding engine to obtain the training image embeddings;
generate the index, wherein the training image embeddings comprise:
a first subset of the training image embeddings associated with training images having a first classification, and
a second subset of the training image embeddings associated with negative training images and having a default classification;
apply the label containing the first classification to each of the first subset of the training image embeddings;
apply the label containing the default classification to each of the second subset of the training image embeddings; and
generate the approximate nearest neighbors model based on the index.

18. The network security system of claim 17, wherein the first classification is one of a gambling classification, a parked domain classification, and a pornography classification.

19. The network security system of claim 18, wherein the security policy enforcement engine is further configured to block the request based on the webpage being classified as the first classification.

20. The network security system of claim 11, wherein the image classifier is further configured to:
in response to a determination that the score is equal to or exceeds a threshold value, classify the subject image with the identified label; and
in response to a determination that the score is below the threshold value, classify the subject image with a default label.

* * * * *